(12) United States Patent
Zhang

(10) Patent No.: US 6,456,261 B1
(45) Date of Patent: Sep. 24, 2002

(54) HEAD/HELMET MOUNTED PASSIVE AND ACTIVE INFRARED IMAGING SYSTEM WITH/WITHOUT PARALLAX

(76) Inventor: Evan Y. W. Zhang, 2552 Mahogany Tr., Centerville, OH (US) 45458

( * ) Notice: Subject to any disclaimer, the term of this patent is extended or adjusted under 35 U.S.C. 154(b) by 0 days.

(21) Appl. No.: 09/444,646

(22) Filed: Nov. 22, 1999

Related U.S. Application Data

(60) Provisional application No. 60/109,612, filed on Nov. 23, 1998.

(51) Int. Cl.[7] .................................................. G09G 5/00
(52) U.S. Cl. ..................................... 345/8; 345/7; 345/9
(58) Field of Search ....................... 345/7, 8, 9; 348/64; 250/352; 367/131; 385/14; 359/356, 354

(56) References Cited

U.S. PATENT DOCUMENTS

| | | | |
|---|---|---|---|
| 4,143,269 A | * 3/1979 | McCormack et al. ........ | 250/352 |
| 4,449,787 A | 5/1984 | Burbo et al. | |
| 4,640,574 A | * 2/1987 | Unger ......................... | 385/14 |
| 4,961,626 A | 10/1990 | Fournier, Jr. et al. | |
| 4,999,005 A | * 3/1991 | Cooper ....................... | 359/356 |
| 5,420,828 A | * 5/1995 | Geiger ........................ | 367/131 |
| 5,512,748 A | * 4/1996 | Hanson ...................... | 250/332 |
| H1599 H | 10/1996 | Task et al. | |
| 6,016,160 A | * 1/2000 | Coombs et al. ............... | 348/61 |
| 6,144,031 A | * 11/2000 | Herring et al. ............. | 250/352 |
| 6,172,657 B1 | * 1/2001 | Kamakura et al. ............. | 345/8 |

* cited by examiner

Primary Examiner—Richard Hjerpe
Assistant Examiner—Kevin M. Nguyen
(74) Attorney, Agent, or Firm—Bernard E. Franz

(57) ABSTRACT

A passive/active infrared imaging system apparatus for mounting on a head/helmet includes a passive infrared camera Head Pack having a removable narrow band filter cover, an objective lens, a beam splitter, an uncooled focal plane array (UFPA) package, an interface board, and a display unit such a liquid crystal display (LCD), with forward/back, up/down, and tilt adjustment functions fitting any mask, mounted in the front of said head/helmet for converting infrared light images into electronic signals. An electronic unit coupled between the UFPA of the infrared camera and the display unit, includes a controller for processing video signals from the infrared camera and supplying them to the display unit. The electronic circuit includes a wireless video & audio transceiver, a piezoelectric microphone, a voice controller, and a neural network pattern recognition chip. The display unit (such as LCD)] is inside the head pack and mounted on the head/helmet for converting electronic signals into visible light images, so that it is in front of eyes of a user, so that the user can directly view an external scene without blocking his normal vision, if the optical axis of the display unit is aligned with the optical axis of the objective lens, the system parallax is eliminated. A Battery Pack having a video controller board and battery is mounted on the rear of the head/helmet so that it gives the video output and power to the infrared system. An eye-safe near infrared laser diode with corresponding optical and electronic attachments mounted on the head/helmet illuminates targets to get images through same passive infrared system.

19 Claims, 16 Drawing Sheets

The pictorial view of the active & passive helmet mounted infrared imaging system

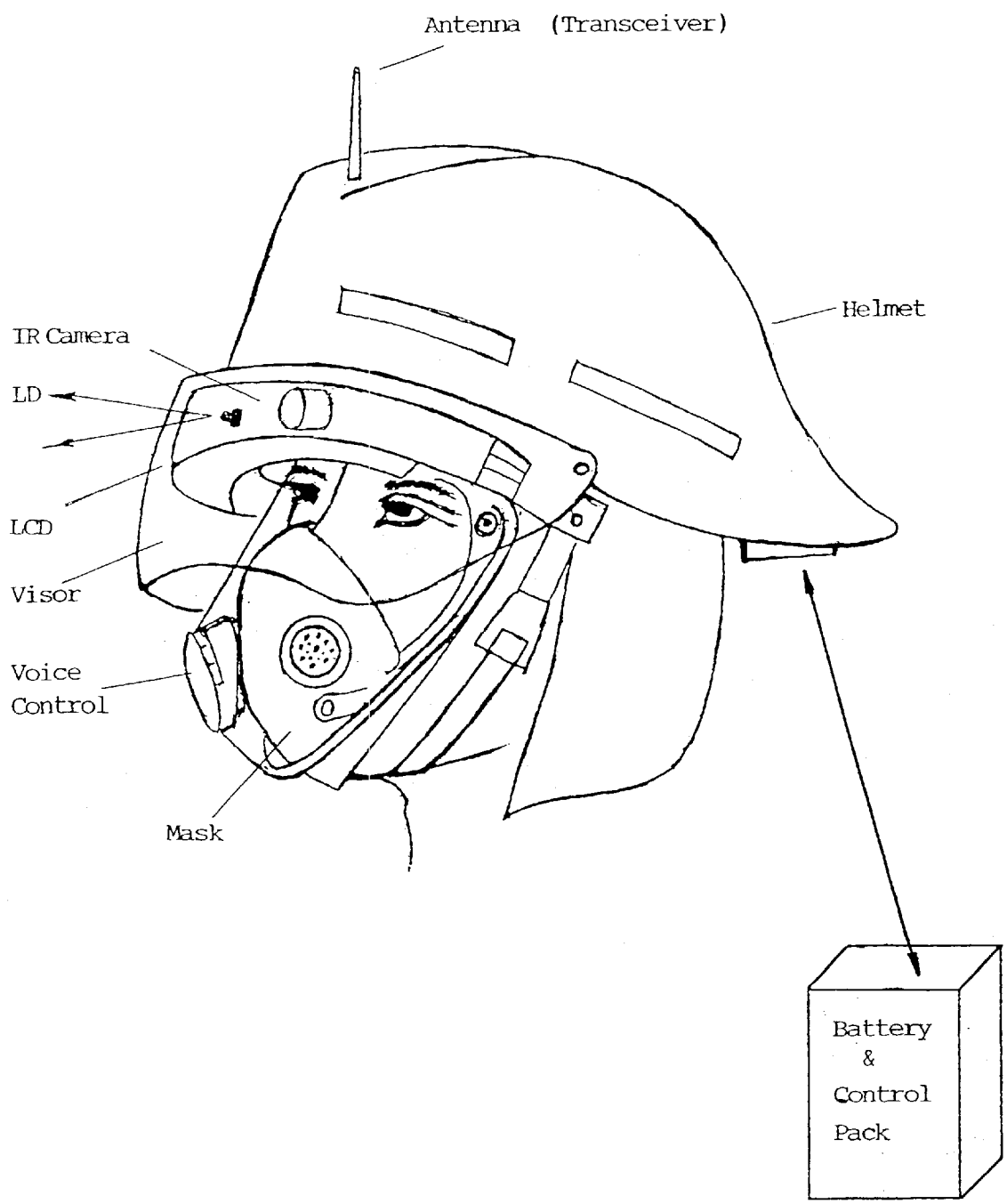
Fig. 1, The pictorial view of the active & passive helmet mounted infrared imaging system

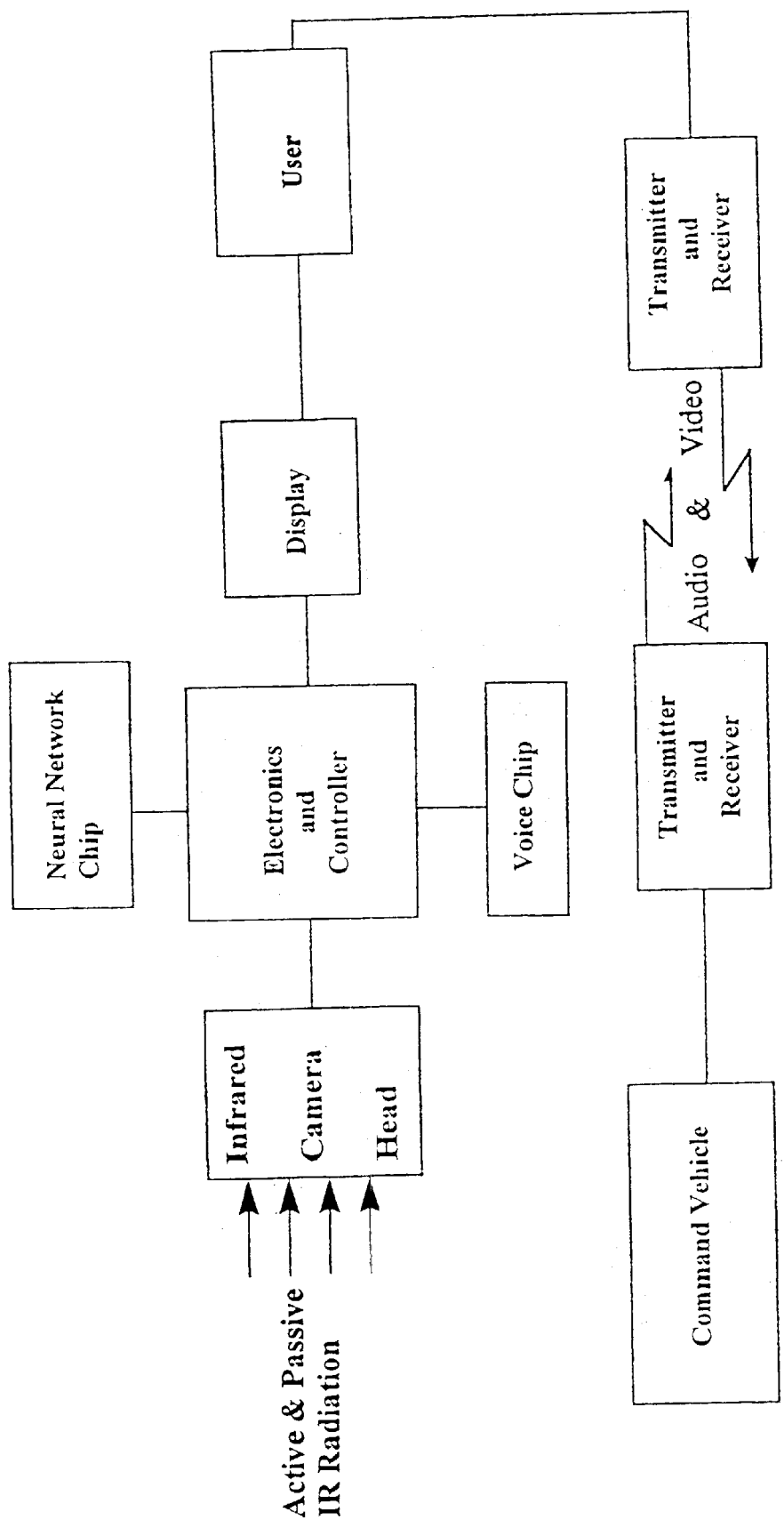
Fig. 2, The block diagram of the passive & active infrared imaging system

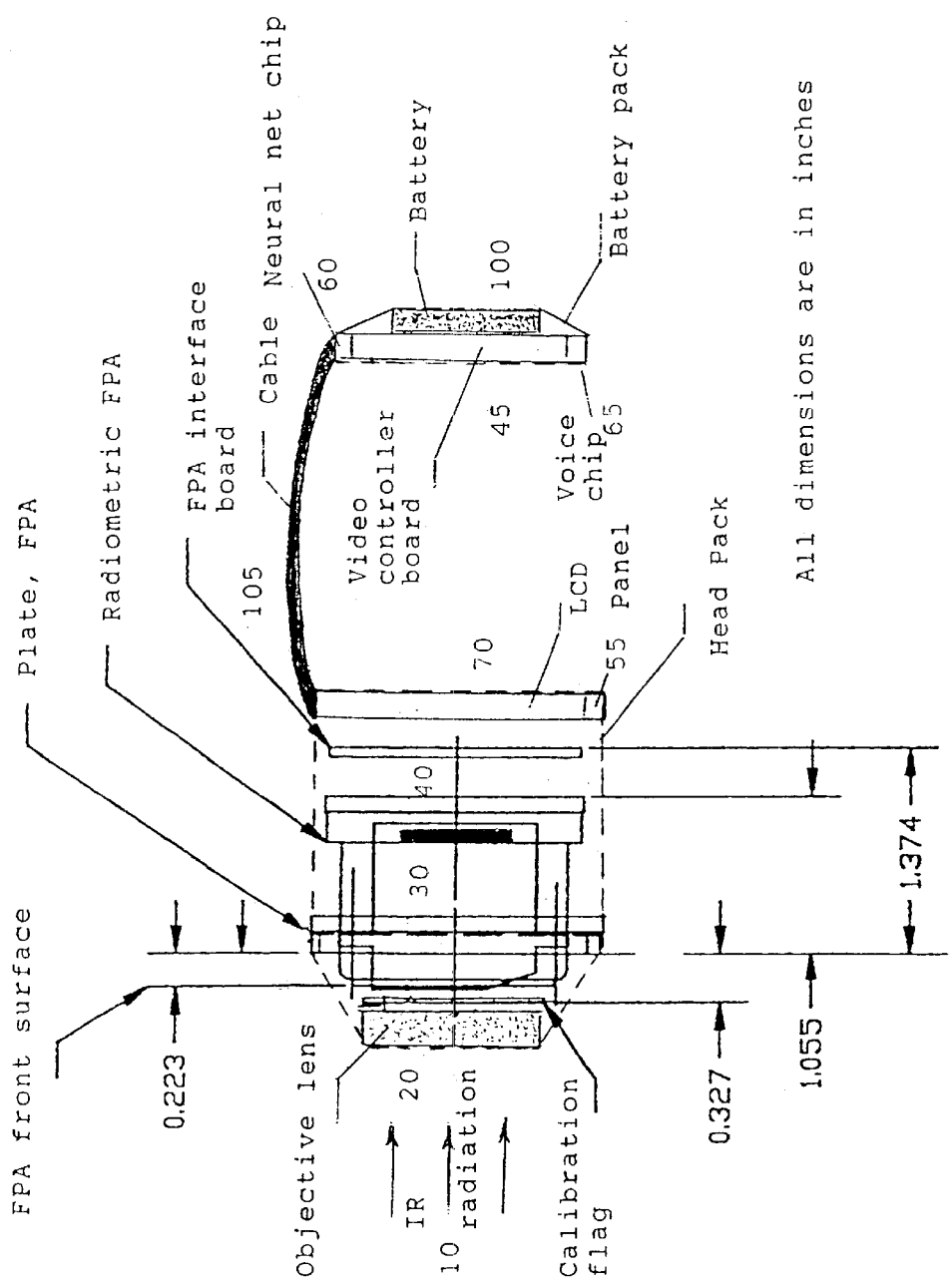
Fig. 3, The preferred embodiment of the passive IR system without parallax

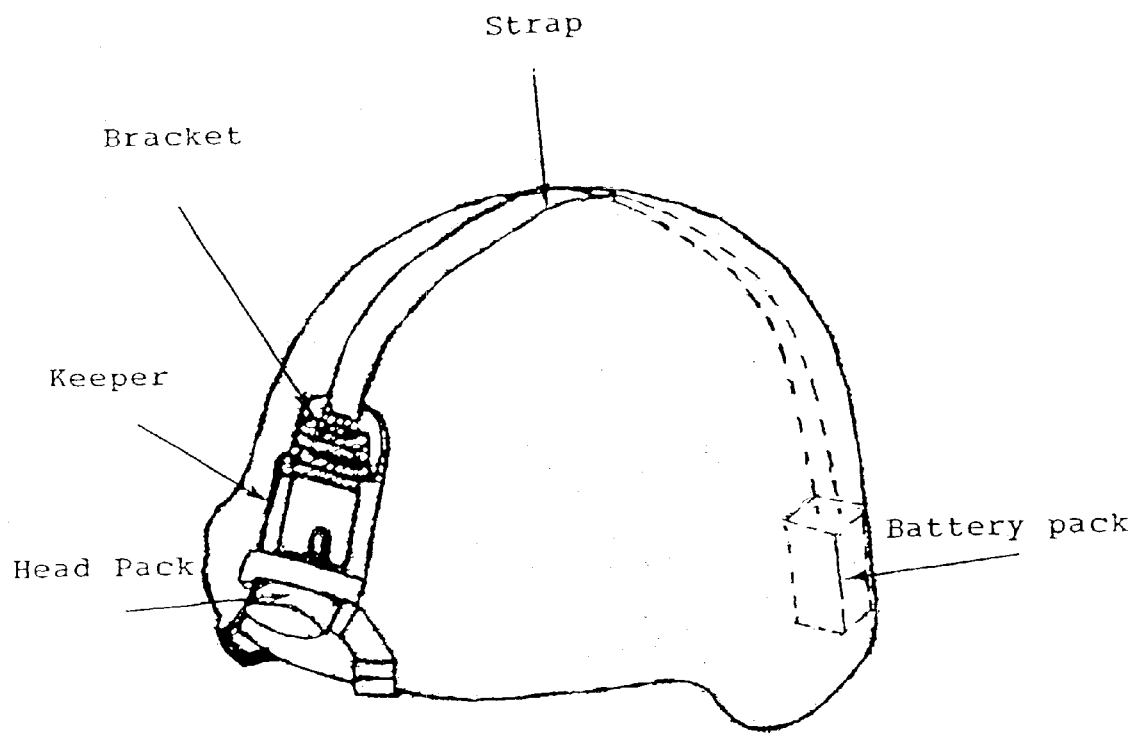
Fig. 4, The head pack and battery pack on the helmet

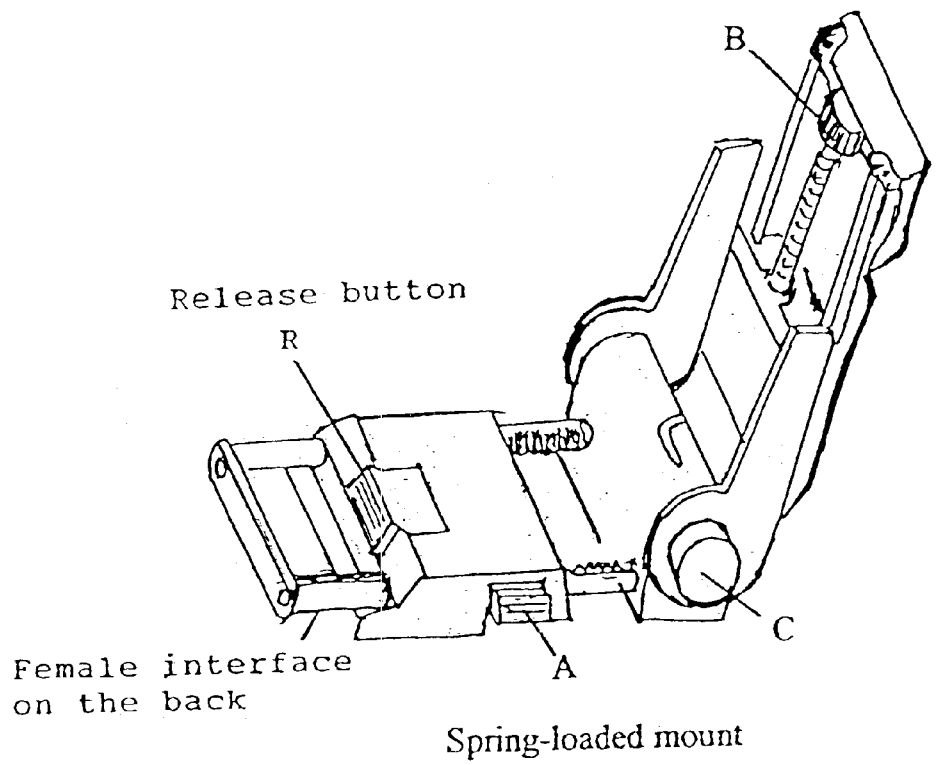
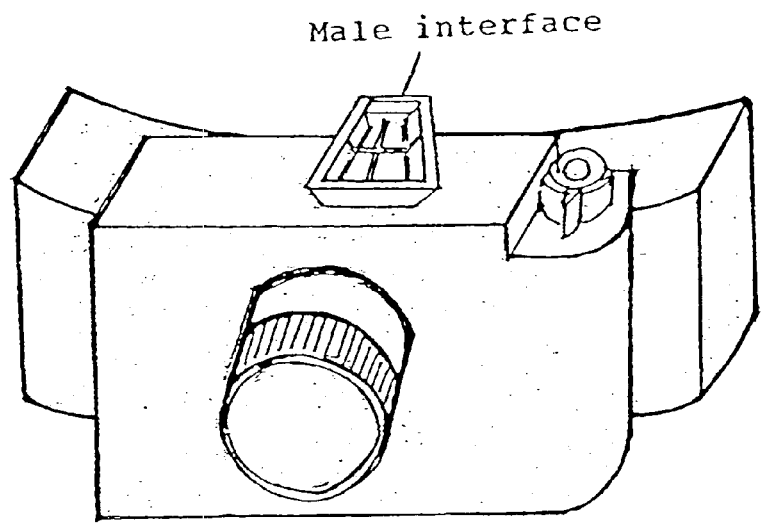
Fig. 5, The spring loaded mount for head or helmet

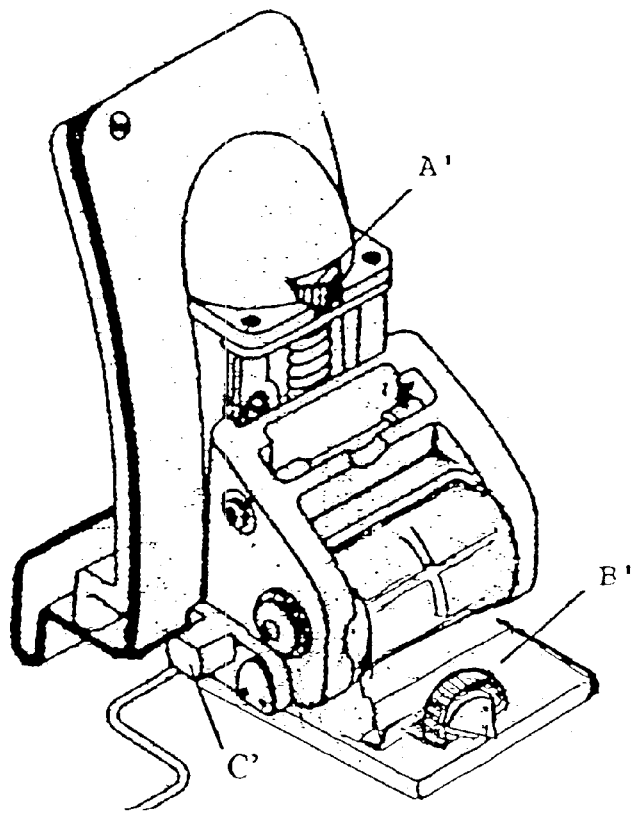
Dove tail mount
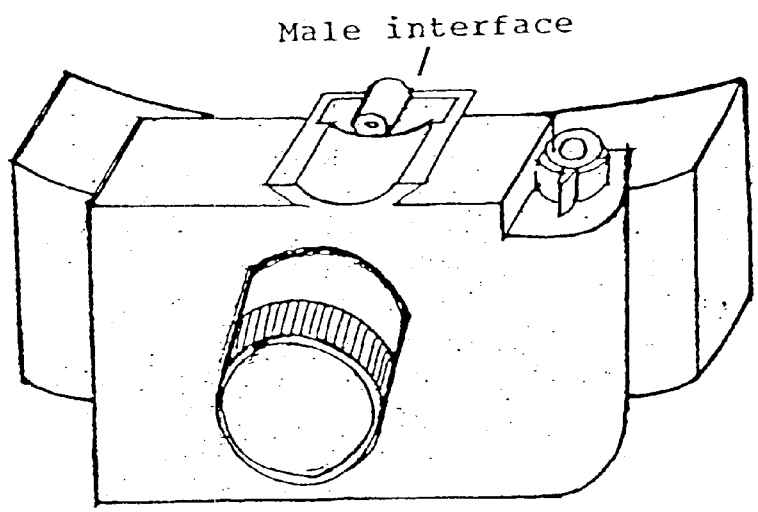
Male interface
Fig. 6, The dove-tail mount for head or helmet

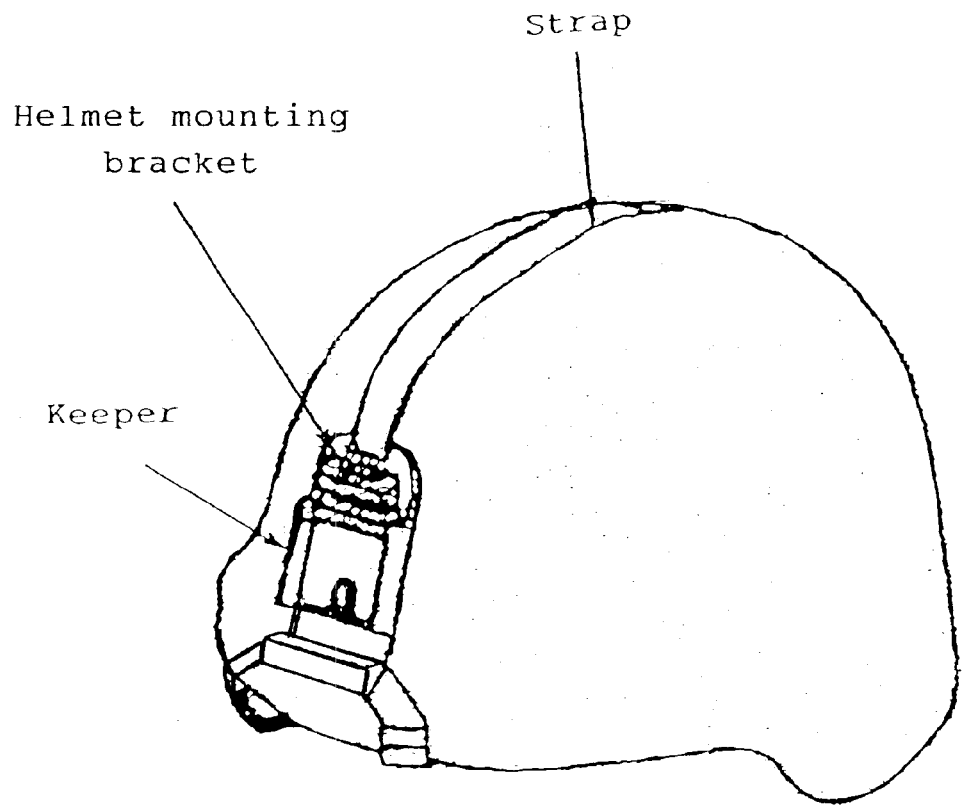
Fig. 7, The end keeper on the head/helmet to interface with the mount

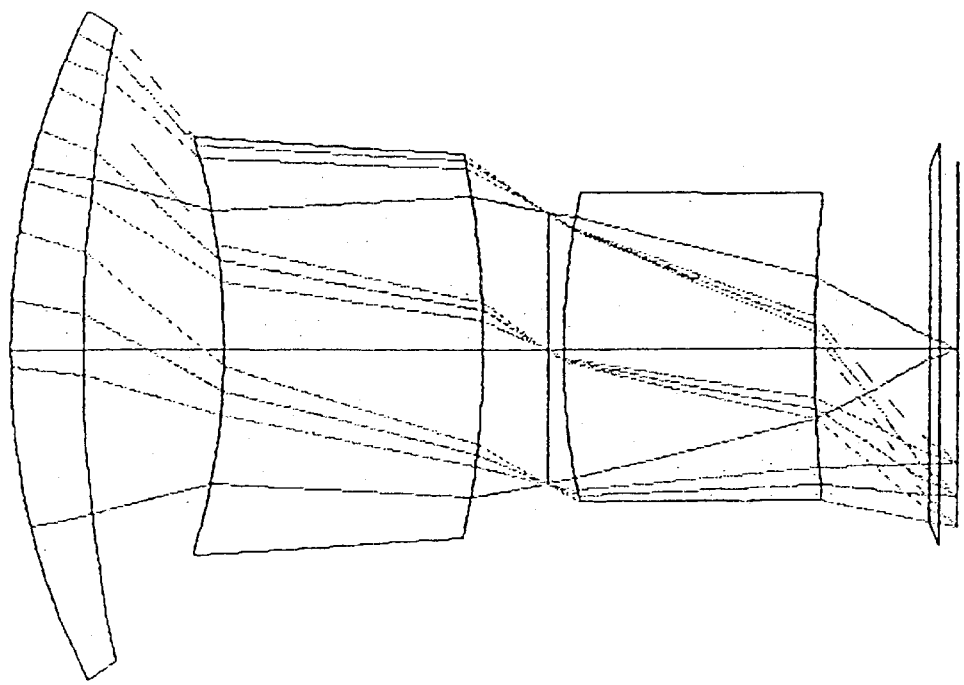
Fig. 8, The non-Ge objective lens with ray tracing result
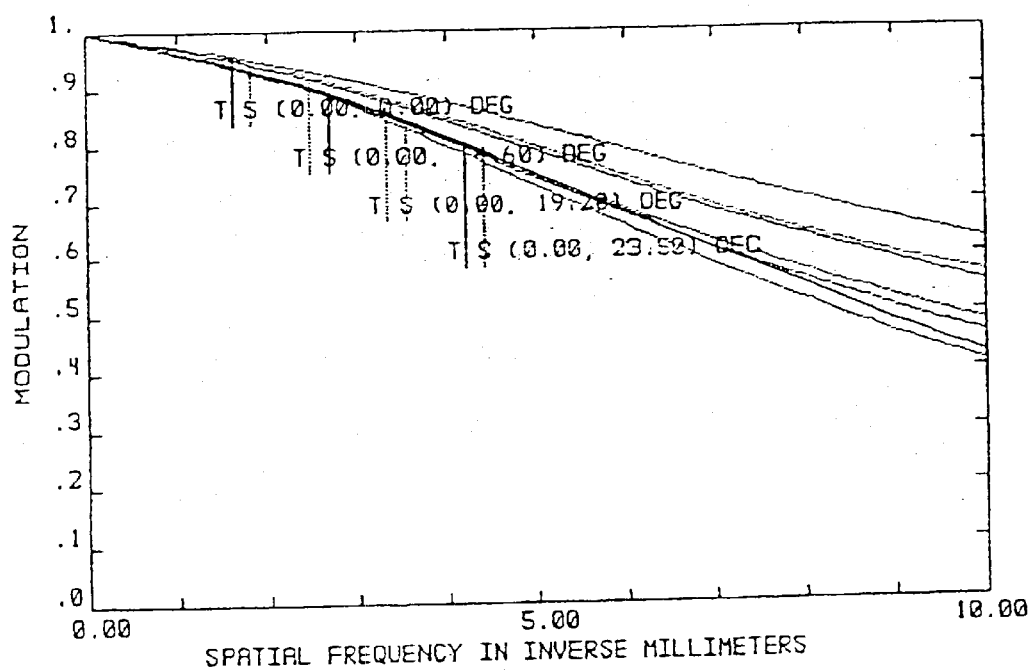
Fig. 9, The MTF diagram of the objective lens

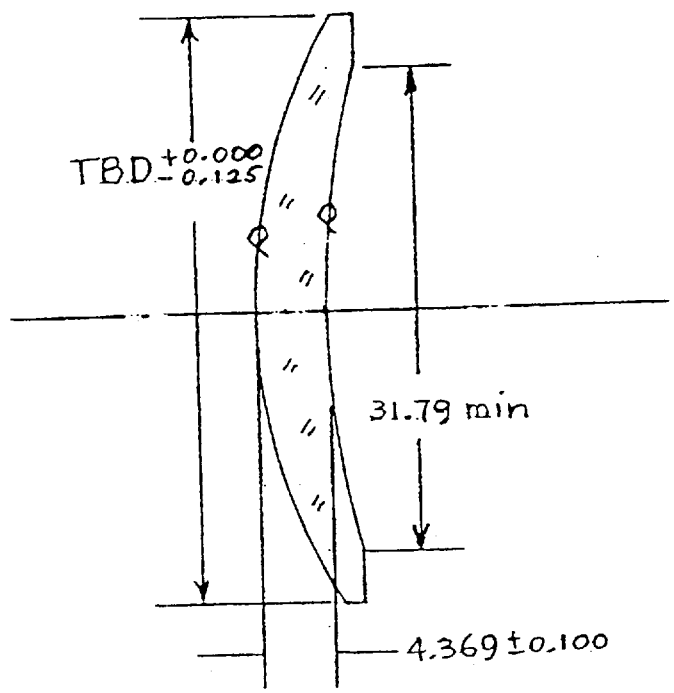
Fig. 10, The structure of the first piece element of the objective lens
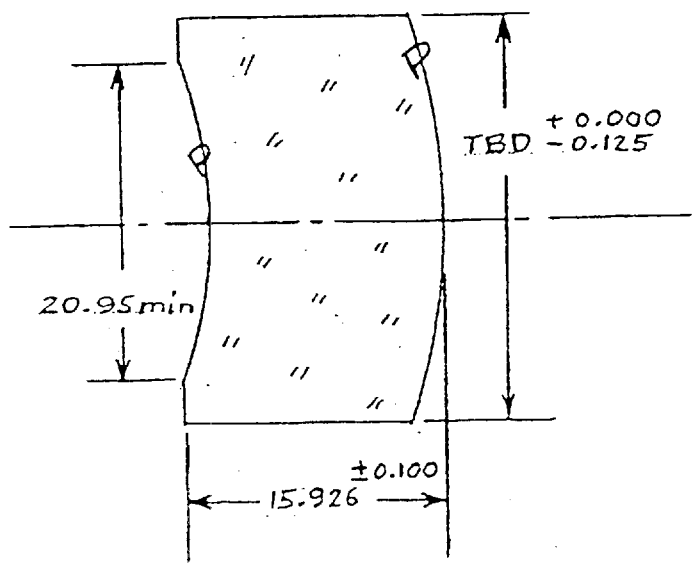
Fig. 11, The structure of the second piece element of the objective lens

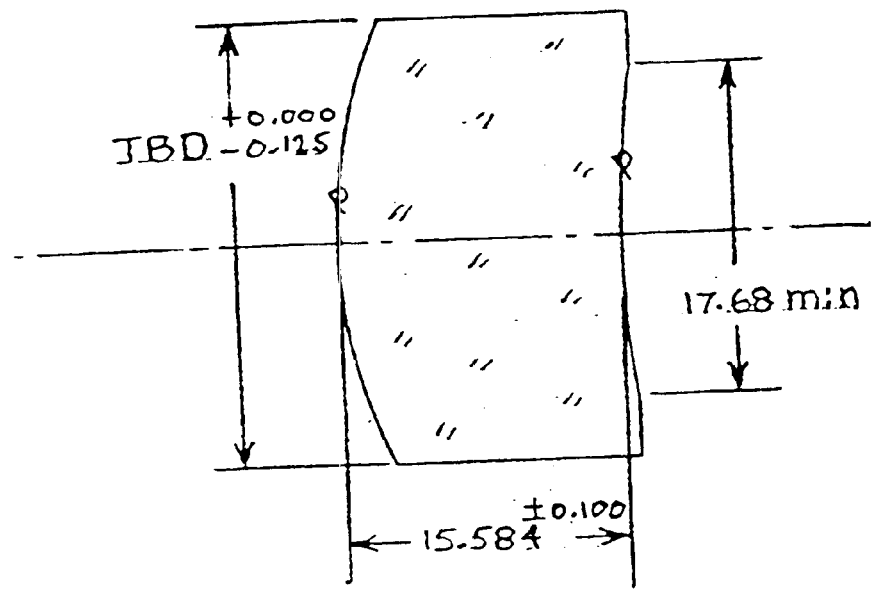
Fig. 12, The structure of the third piece element of the objective lens

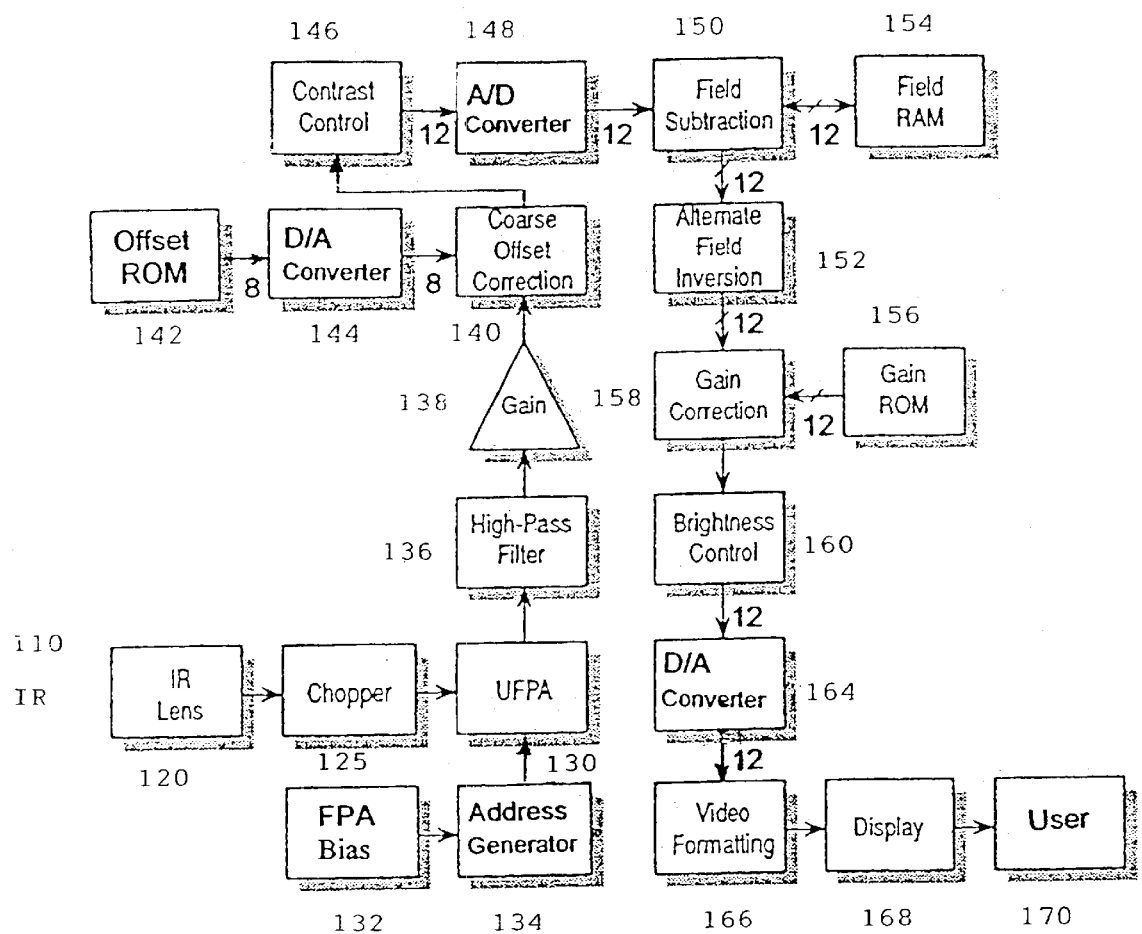
Fig. 13, The block diagram of the electronic circuit of the passive IR imaging system

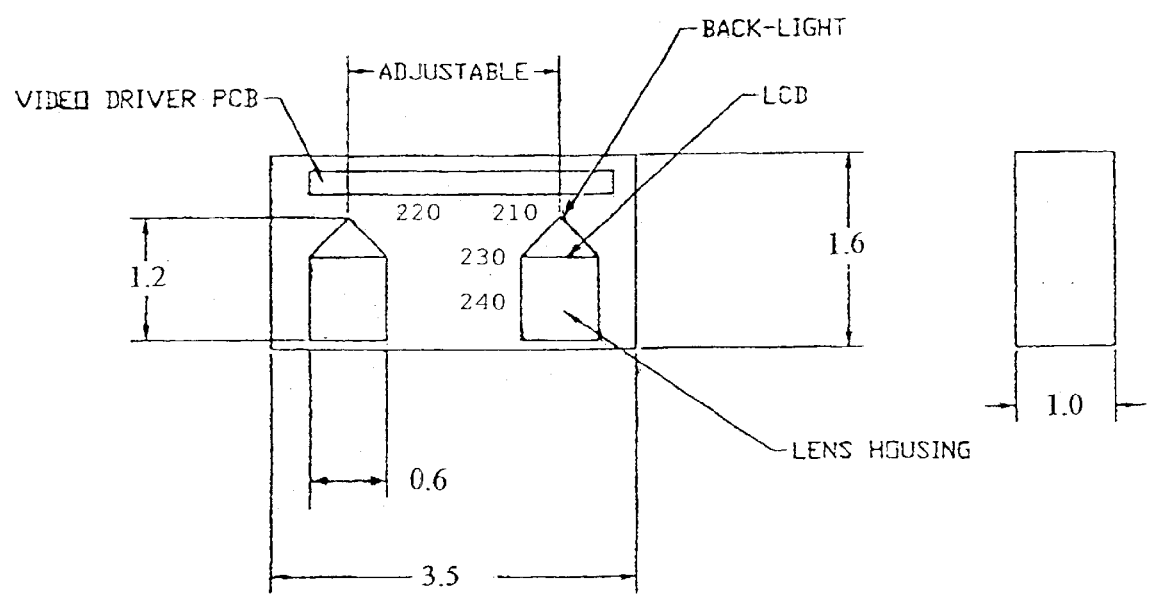
Fig. 14, The configuration of the Liquid Crystal Display (LCD)

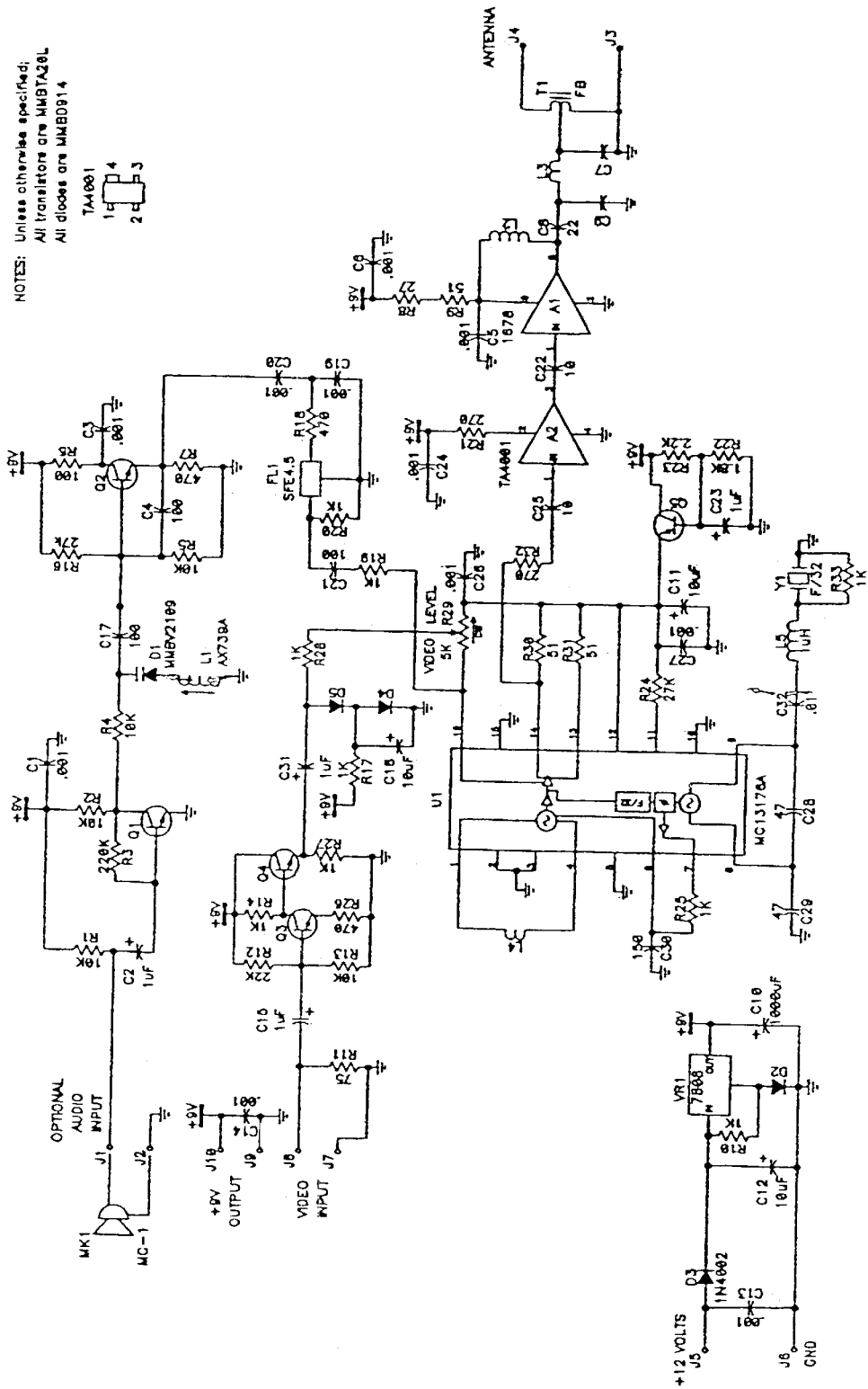
Fig. 15, The schematic diagram of the wireless transmitter

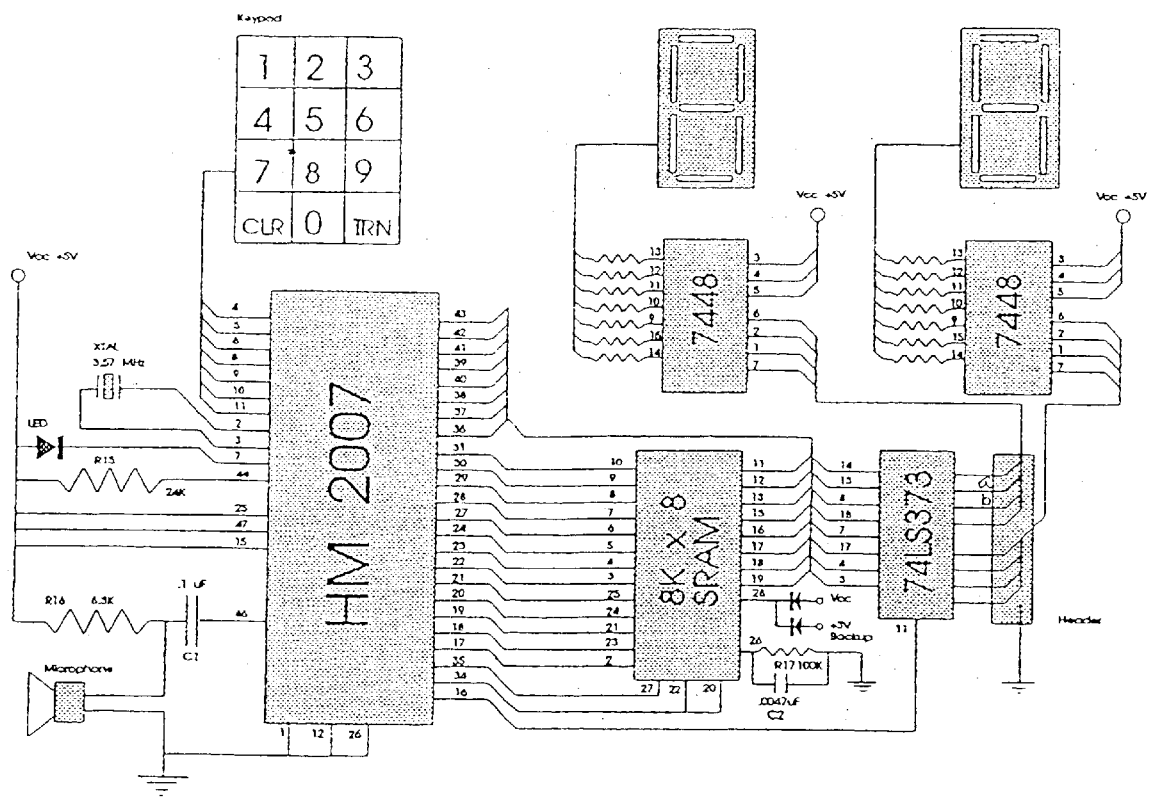
Fig. 16, The schematic diagram of the voice controller

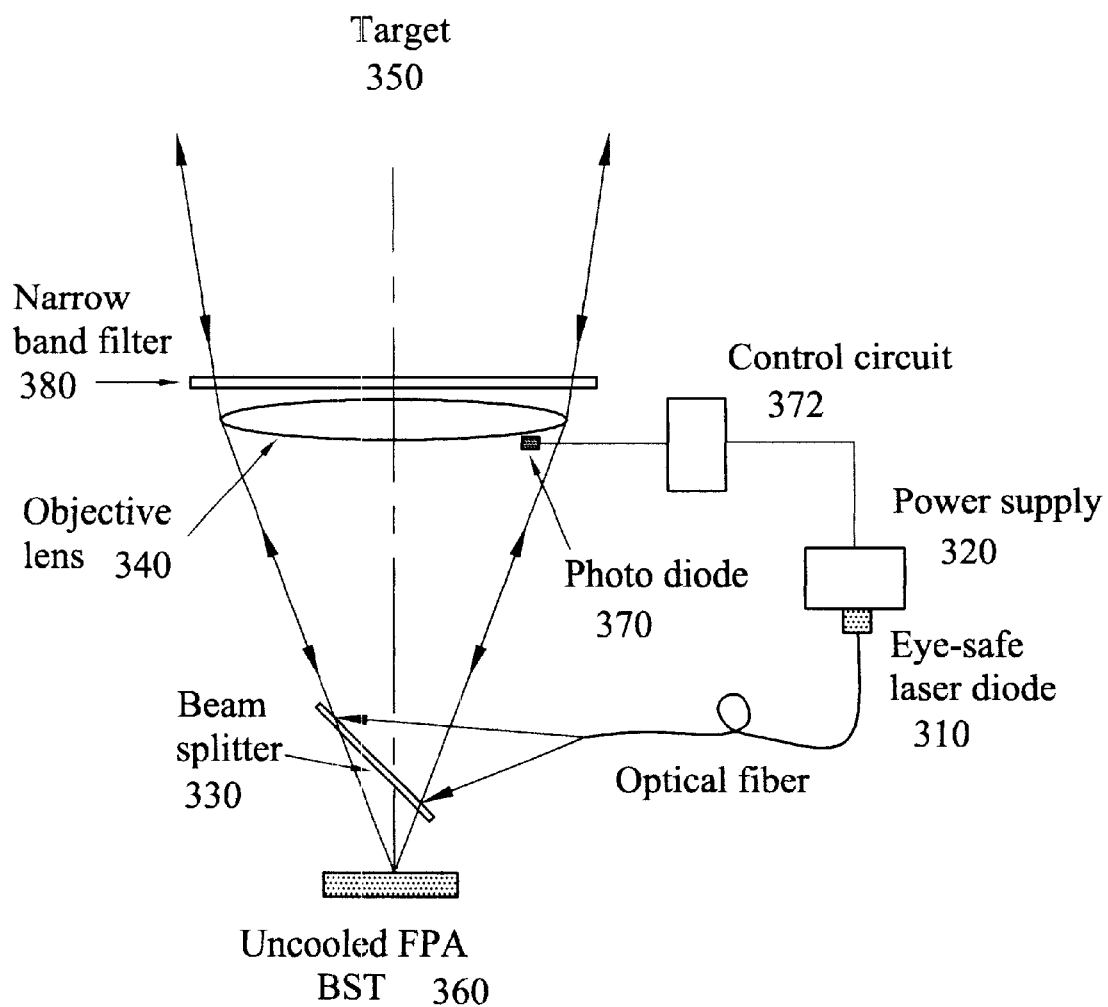
Fig. 17, The preferred embodiment of the active IR imaging system

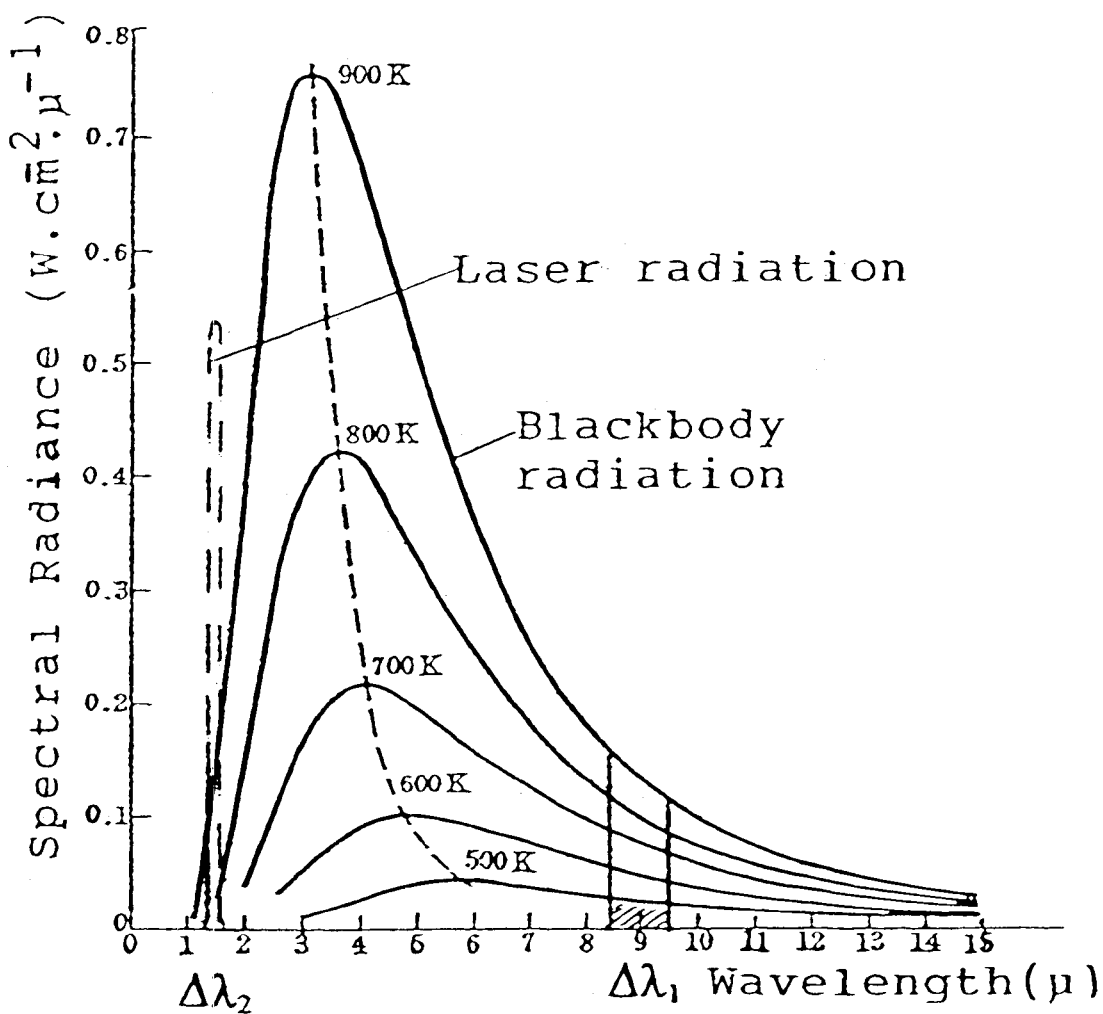
Fig. 18, The laser radiation and the blackbody radiation

HEAD/HELMET MOUNTED PASSIVE AND ACTIVE INFRARED IMAGING SYSTEM WITH/WITHOUT PARALLAX

Priority is claimed of provisional patent application Ser. No. 60/109,612 filed on Nov. 23, 1998, for an "Advanced Rescue Vision System". Said provisional application is hereby incorporated by reference and made a part hereof as though fully set forth.

The invention was made with Government support under SBIR contracts of Phased-I and Phase-II awarded by the Department of the Air Force.

BACKGROUND OF THE INVENTIONS

1. Field of the Inventions

The inventions relate to a head mounted or helmet mounted passive and active infrared imaging system, and more particularly to an infrared imaging system for an advanced rescue vision system. One embodiment relates to a head/helmet mounted passive infrared imaging system; and another embodiment relates to an active head/helmet mounted infrared imaging system. Both systems share the same objective lens, uncooled focal plane array, image processing electronic circuit, display and head/helmet mount.

2. Background Information

Infrared means that the wavelength of infrared radiation is longer than visible light (from $0.38\mu$ to $0.78\mu$). Infrared light shares many of the properties of visible light, but its different wavelength has several unique characteristics. For instance, materials that are opaque to visible light may be transparent to infrared, and vice-versa. Infrared cannot be seen by human eye, and infrared is much less subject to scattering and absorption by smoke or dust than visible thus the IR imager can see through smoke and dust.

Unlike visible light, which is given off by ordinary objects only at very high temperatures, infrared energy is emitted by all objects at ordinary temperatures higher than 0° K. This means that infrared energy is all around us all the time, even in the dark Different objects give off varying amounts of infrared energy, depending on the temperatures of the objects and their emissivities. Passive IR cameras are designed to sense differing amounts of infrared energy coming from the various areas of a scene by focal plane array detector and to convert them to corresponding intensities of visible light by electronics for display purposes. This permits true see-in-the-dark capability and the ability to observe the thermal properties in all light conditions.

Contemporary passive infrared imagers use cryogenic coolers, complex IR optics and costly IR sensor materials, and their consequent high cost restrict their applications such as for fire fighting and security. In this invention, Uncooled Focal Plane Array (UFPA) will be adopted.

In a staring imager, a 2D FPA is placed at the focal plane of the lens. One IR sensor element is used for each pixel in the display, and no moving mirrors are used. The requirement on the response time of the IR sensor element is greatly reduced, to about the frame time of the imager (typically $\frac{1}{30}$ sec). The dwell time of the image on each pixel is increased by about 100 compared to a scanning imager, improving the relative sensitivity of the staring imagery by about 10, which is desirable for specialised military purposes. These advantages of staring operation also allow uncooled thermal sensors to produce good quality IR images.

Uncooled silicon microbolometer (MBT) and Barium Strontium Titanate (BST) arrays represent a new capability in staring imager development, allowing excellent IR imaging performance at much lower cost, size and weight. Uncooled imager sensitivity is now better than 0.04° C., surpassing the sensitivity of some cooled scanned systems currently in military service and even competing with cooled staring systems in some applications.

Some of the most significant advantages of uncooled MBT and BST IR imagers in comparison with cooled IR imagers are: no cooling system, lower unit and life cycle cost, reduced power consumption, smaller size and lighter weight, higher system reliability, no audible cooler or scanner noise, and capability for multispectral response.

The extreme thermal environment experienced by equipment utilized in front line fire fighting applications (transition from 20° C. ambient to 1,000° C. in seconds), together with weight and size constraints tend to limit the level of thermal insulation which can be used to protect the sensor. However, by utilizing uncooled IR detector technology together with advanced optics and thermal management technique, compact IR imager can be manufactured which withstands these environments.

By matching the field of view of the Helmet Mounted IR sensor to that of the display, the fire fighter is able to see the IR image with the 1:1 surroundings and the 1:1 "real world". This combination offers hands-free operation together with unrivalled manoeuvrability.

However, current helmet mounted passive IR imagers using UFPAs have many shortcomings such as: large, heavy, expensive, the Germanium (Ge) lens will turn to opaque within 20 minutes in fire fighting, there is a parallax between the camera and viewer, the user can not speak under mask, the display blocks user's normal vision, and the IR system can not fit the mask. The purpose of this invention is to overcome all these problems.

It is well known that the passive IR image only represents the temperature and emissivity differences of the targets not their detailed shape differences, therefore it is hard to distinguish a person if he is Mr. Smith or Mr. Johnson. In this invention, an near infrared eye-safe laser diode is integrated to the passive system to illuminate the target and get its reflective image from the same UFPA of BST, thus very sharp image can be obtained. To identify friend or foe in battle field and security applications becomes possible.

In fire fighting, the temperature is very high. The passive IR imager can not detect a person behind the firewall. Eventually, it will be saturated by the strong high-temperature environmental IR radiation and thus becomes useless. It is an unsolved problem in the history. The purpose of the active IR imaging system of this invention is to solve this problem.

SUMMARY OF THE INVENTION

Passive System

The innovative head/helmet mounted passive infrared imaging system design is shown in FIG. 1, and its functional block diagram is shown in FIG. 2. The detailed explanation of the diagram will be given in the next paragraph of preferred embodiments. The invention includes following new ideas/technologies:

Use uncooled focal plane array to eliminate the cooling system;

Design non-Ge objective lens and window and use new manufacturing methods to cover the whole spectrum from near infrared to long infrared, increase the sustained temperature, and reduce the cost to half of the old optics;

Adopt separated imaging head and body configuration to realise compact head design;

Design special Liquid Crystal Display (LCD) to enhance the image contrast without blocking user's normal vision;

Eliminate the parallax between the camera and display to see the correct target location;

Design special mechanical mounting to clip the system on the head mount or helmet and release the system from the head mount or helmet easily without using any tool;

Use fly logic or neural network pattern recognition chip to distinguish human victim or fire from background;

Design special adjustment mechanism to let the LCD has forward/back, up/down, and tilt adjustments to fit any mask;

Adopt piezoelectric film contacting to user's forehead or neck as microphone to speak under mask without using mouth;

Use voice control chip to perform hands-free operation;

Design wireless audio and video transceiver to link the frontier with the rear headquarters.

Reduce the weight and cost to half of the contemporary systems.

Active System

The innovative active IR imaging system is shown in FIG. 17 of the preferred embodiment. The system has following new ideas/technologies:

Integrate a very small eye-safe laser diode at wavelength around $1.5\mu$ on the head mount or helmet to illuminate the targets;

Use the same non-Ge objective lens to get the active IR image because the lens has high transmittance from near infrared to long infrared;

Use same UFPA of BST to image the targets because the response of the BST is $1$–$35\mu$;

See through the smoke, dust, and darkness;

Get clear image and distinguish the friend and foe;

See through the firewall and detect a person behind the firewall;

Reduce the weight and cost to ⅕ of the passive system if the active system is a stand along system.

BRIEF DESCRIPTIONS OF THE DRAWINGS

FIG. 1 is the pictorial view of the head/helmet mounted active & passive IR imaging system;

FIG. 2 is the block diagram of the active & passive infrared imaging system shown in FIG. 1;

FIG. 3 is the preferred embodiment of the passive system that does not have parallax;

FIG. 4 is the head pack and battery pack on the helmet;

FIG. 5 is the spring-loaded mount for head or helmet;

FIG. 6 is the dove-tail mount for head or helmet;

FIG. 7 is the end keeper on the head/helmet to interface the spring-loaded or dove-tail mount;

FIG. 8 is the 3-piece non-Ge objective lens design with ray tracing result;

FIG. 9 is the MTF diagram of the objective lens;

FIG. 10 is the structure of the first piece element of the objective lens;

FIG. 11 is the structure of the second piece element of the objective lens;

FIG. 12 is the structure of the third piece element of the objective lens;

FIG. 13 is the block diagram of the electronic circuit of the passive IR imaging system;

FIG. 14 is the structure of the Liquid Crystal Display (LCD);

FIG. 15 is the schematic diagram of the wireless transmitter;

FIG. 16 is the schematic diagram of the voice controller;

FIG. 17 is the preferred embodiment of the active IR imaging system;

FIG. 18 is the laser radiation in its very narrow waveband and the blackbody radiation.

PREFERRED EMBODIMENT OF PASSIVE IR IMAGING SYSTEM

As shown in FIG. 3, Infrared radiation 10 from the target is collected by the Non-Ge (or Ge) objective lens 20 and sent to the Uncooled Focal Plane Array (UFPA) 30. The UFPA has pixels of n columns and m rows. Its readout circuit is a silicon integrated circuit which has following functions: (a) detector sense amplifier (one per pixel), (b) column multiplexer switch (one per column), (c) column amplifier (one per column), and (d) row multiplexer switch (one per row). Therefore, the parallel optical input becomes serial electronic output. After pre-processing of the UFPA signal and converting the Analog data to Digital (A/D) by the Focal Plane Array Interface Board 40, the signal goes to the main processing board—Video Controller Board 45 having software written on the EPROM. A Voice Activated Switching (or Command) Chip 60 and a Pattern Recognition Chip 65 are linked with the Video Board to help the signal processing. The output of the Video board after D/A converter becomes analog TV signal RS-170 and is sent to the Liquid Crystal Display (LCD) 70. There is also a digital output from the Video Board for computer or other digital equipment/display use. Linked with the Video Board, there is a Control Panel 55 to control the On/Off switch, brightness, contrast, polarity, and calibration. Because the link between the Interface Board and Video Board is digital, thus we can put the video board with the Power Supply Board 100 together. They can be far way from the UFPA such as at the rear of the helmet by using a cable 105. Therefore, the weight and volume in the front of the helmet will be much smaller. Compact design can be realised. The more important meaning of the design is that the parallax (or dead angle) between the objective lens and display (or eye) can be eliminated. This parallax is existing for all helmet mounted IR imaging systems and it must be eliminated. Our unique method of eliminating parallax is as follows:

Because the Interface Board 40 is very small we can put it directly behind the UFPA 30 and it will not block user's normal vision. Directly behind the Interface board 40 is the Monocular Liquid Crystal Display (LCD) 70. Its optical axis is aligned with the optical axis of the objective lens 20. Therefore, the parallax (or dead angle) between the objective lens and LCD is eliminated. When user's eye looks at the LCD, his sight will be as same as the objective lens, thus he can get correct position of the target. It is very important for doctor to do the surgery in the battle field without any light (light is not allowed during the war). Otherwise his knife will cut a wrong place.

As shown in FIG. 3 and FIG. 4, the objective lens, UFPA, interface board, and LCD are put into one envelop to make a very compact and light weight head pack. The video board is put into the battery pack at the rear of the helmet as weight balance of the head to let the gravity center of the system at the center of the helmet. We will use one 12 VDC or two 6

VDC NiCd batteries as the power supply for UFPA and all boards mentioned above. It can last for more than 6 hours, extra battery box on the waist is not necessary. However, as an optional design, we also can furnish a Lithium Chloride battery box on the waist connecting with the battery pack for spare use; it can last for 32 hours.

In order to get forward/back, up/down, and tilt adjustments for the IR system to let it fit any mask without blocking user's normal vision, we will use spring-loaded mount or dove-tail mount because they can be mounted on the head or helmet. Therefore, two mount interfaces are designed. For the spring-loaded mount, the mount interface is shown in FIG. 5. The male interface is molded on the head pack of the IR imaging system. It is easy to be inserted into the female interface at the back of the spring-loaded mount shown in FIG. 5. By releasing the button R of the spring-loaded mount, the head pack is easy to be taken off from the mount. By pushing button A of the spring-loaded mount, the head pack can be moved forward and back; by rotating knob B, the head pack is able to move up and down. By pushing button C, the head pack can be rotated up 90 degrees thus the head pack will not block soldier's normal vision. For the dove-tail mount, the male mount interface of the head pack is shown in FIG. 6. When it is inserted into the groove A' of the female dove-tail mount, the head pack can be moved up and down. By rotating knob B', the head pack is able to move forward and back. By pushing the button C', the TGA can be rotated up 120 degrees. The spring-loaded mount and the dove-tail mount are attached to one end keeper in the front of the head or helmet shown in FIG. 7.

As shown in FIG. 3, for the attachment of the battery pack to the mount assembly, we will do similar thing as we did for the head pack. We will make a male interface for the battery pack and it can be inserted into the female interface of another end keeper located at the rear of the helmet. A strap snapped by two head/helmet-mounting brackets manufactured with two keepers together tightens two end keepers. This kind mounting system is very secure.

The cable with plugs to connect head pack and battery pack will be under and attached to the strap, thus it will not cause snagging or interference with the user's performing his duties. The system also has neck cord and eyecups.

The LCD can be binocular, thus the user can use two eyes for more comfortable observation, but in this case his another eye will have parallax with the lens. If he does not want parallax, he can close another eye or simply pull down a piece of plastic to block another viewing window to let the binocular LCD become monocular.

The Video Output 50 and the Audio Input 80 are sent to the Wireless Transceiver 85 on the user side. Therefore the Video and Audio received by the Transceiver 90 on the Commander side 95 can be displayed on the monitor or LCD. Similarly, the Commander also can send the map, manual or instruction to the user side Transceiver 85 by using his side transceiver 95. This Video and Audio link between front and rear or between individual soldiers is very important during the war.

DETAILED SYSTEM/SUBSYSTEM DESIGN/DESCRIPTION

1. Objective Lens

An objective lens for helmet mounted IR imaging system in fire fighting application must have large field of view ($\geq 30° \times 40°$), fast speed ($F \leq 1.0$), good image quality (Modulated Transfer Function $MTF \geq 60\%$ at center and 40% at edge), high transmittance in the required waveband of $8-12\mu$ ($\geq 85\%$), low cost ($\leq \$500$), and sustain high environmental temperature ($\geq 300°$ C.). Table 1 is the list of the objective lens design requirement for a UFPA of BST.

TABLE 1

| Objective Lens Design Requirement for IR Imager | |
|---|---|
| Effective Focal Length | 0.90" (22.86 mm), fixed focal plan |
| F Number | 1.0 |
| Diameter | 0.9" (22.86 mm) |
| Field Of View | 30° × 40° |
| Image Format Height | 0.468" (11.89 mm); 245 pixels, 48.5 $\mu$/pixel |
| Image Format Width | 0.626" (15.90 mm); 328 pixels, 48.5 $\mu$/pixel |
| Back Working Distance | $\geq 7$ mm |
| Window Thickness | 0.635 mm |
| Window to FPA Distance | 1.04 mm |
| MTP @ fo = 10 lp/mm | 60% at center and 25% at edge for infinity target |
| Distortion | $\leq 5\%$ at edge |
| Instan. Depth Of Field | 2 feet to infinity |
| Spectral Band | $8-12\mu$ |
| Average Transmittance | 85% |
| Minimum Transmittance | 75% |
| Maximum Number Of Lens | 3 |
| Maximum Lens Diameter | 1.15" (including the wandering of pupil) |
| Coating Material | Non-thoriated |
| Environmental Coating | Outer surface of outer lens |
| Athermalization | MTF requirement met for ambient storage air temperature range of −20° C. to +55° C. |

Unfortunately, the Germanium (Ge) lens currently used for all long wavelength IR imagers is very expensive and it will turn to opaque when temperature raises to 150° C. (in fire fighting, the temperature can rise to 1,000° C. within a few minutes). Therefore, we must find new materials for the objective lens.

From the Principal Investigator's book "Infrared Optical Engineering" we found that Polycrystals ZnSe and $(ZnS)_x(ZnSe)_{1-x}$ have good transmittance from $1\mu$ to $14\mu$. However, by only using these materials, we still can not design a good objective lens. After many times of practical designs and tried many different optical materials, finally we found that infrared optical glass AMTIR-1 ($Ge_{33}As_{12}Se_{55}$) is a good material which not only has high transmittance from $1\mu$ to $14\mu$., but also can match ZnSe or $(ZnS)_x(ZnSe)_{1-x}$ to make a good objective lens.

We will use Chemical Vapor Deposit (CVD) method and a new processing method—hot pressed method to make the polycrystals.

The procedure of making ZnSe polycrystal using the CVD method is to let the Zn vapor and $H_2Se$ vapor make a reaction under a temperature greater than 600° C. and under a pressures less than 100 Torrs. The resulting reaction can be described as:

$$Zn+H_2Se=ZnSe+H_2 \text{ (gas)} \tag{1}$$

The material $Z_nS_e$ molecular is then deposited on a graphite substrate to obtain a polycrystal. The size of the polycrystal is about $50-100\mu$. The growing speed is about $200\mu$/hr. Stress can be removed by annealing. By using the CVD method, large size and good optical performance polycrystal ZnSe can be obtained. The procedure of making alloy $(ZnS)_x(ZnSe)_{1-x}$ is similar. $(ZnS)_x(ZnSe)_{1-x}$ has better mechanical performance than ZnSe.

The procedure of making hot-pressed polycrystal is as follows:

It is well known that the transmittance of polycrystal is depending on the scattering and absorption of impurities and micro gas holes (air bubbles). The purpose of hot pressing is to use high temperature and high pressure removing impurity and micro gas holes. Therefore the polycrystal will become a pure polycrystal. Before hot pressing, we put ZnSe powder under $H_2$, $H_2Se$ and other inert gases and hit it to 400–600° C., then Se and other impurities can be removed. For a pure polycrystal its transmittance can be expressed as:

$$T=I/I_0=e^{-\alpha L}\exp\{-C_0L_v d_v[(n-n_v)/\lambda]^2\} \quad (2)$$

where, I is the intensity of transmitted light, $I_0$ is the intensity of incident light, $\alpha$ is the absorption coefficient of polycrystal ($cm^{-1}$), L is the thickness of the polycrystal (cm), $C_0$ is a constant (usually $C_{0=}7$), $L_v$ is the equivalent thickness of micro gas holes ($\mu$), n is the refraction index of the polycrystal $n_v$ is the refraction index of the micro gas hole ($n_v \approx 1$), and $\lambda$ is the wavelength. Eq. (2) represents the effect of micro gas holes to the transmittance of polycrystal. Under high temperature (400–700° C.) and high pressure (1,000–3,000 $kg/cm^2$), the micro gas holes will be removed and the surfaces of micro polycrystal particles will contact each other closely, thus high density and very stable hot-pressed polycrystal can be formed. The optical, thermal, and mechanical features of the polycrystal will be almost as same as the pure crystal but the price will be much lower than pure crystal, because unlike pure crystal, it is not necessary to grow the single crystal. We only need polycrystal powders. The polycrystal powders can be easily hot pressed into specific shape and thickness of window or lens. The size can be very big. The hot pressed window or lens then can be grounded and polished. Significantly less labor is involved. Since the methodology of producing a hot pressed polycrystal window or lens is straight forward, the mass-production is relatively simple. Therefore, the cost of the window or lens made by hot-pressed polycrystals ZnSe or $(ZnS)_x(ZnSe)_{1-x}$ will be only 20% of the window or lens made by crystal Ge. Besides, the polycrystals ZnSe or $(ZnS)_x(ZnSe)_{1-x}$ has much broad wave band than Ge, and also has much higher applicable temperature than Ge. When the environment temperature reaches 150° C., the Ge lens becomes opaque, but the new non-Ge lens never turns to opaque up to 300° C.

By using the hot-pressed polycrystals, not only we can make large lenses and windows but also can make large optical head domes for missiles.

By using the automatic lens design software developed by the inventor and the materials mentioned above, an excellent objective lens consisting of 3 pieces is designed and manufactured for the IR imager. It satisfies the requirement listed in Table 1. The ray tracing result of the objective configuration, its MTF diagram, and the structures of its 3 lens elements are shown in FIGS. 8, 9, 10, 11 and 12. The lens data are listed in Table 2. From the MTF we can see that the quality of the objective lens is very good.

TABLE 2

The Data of Designed and Manufactured Objective Lens

| Surface | Radius | Thickness | Material | Clear Aperture |
|---|---|---|---|---|
| 1. | 32.371 | 4.369 | Amtir-1 | 33.165 |
| 2. | 61.528 | 8.506 | | 31.79 |
| 3. | −30.720 | 15.926 | ZnSe | 20.95 |
| 4. | −41.562 | 3.998 | | 19.20 |
| 5. | Stop | 0.997 | | 13.45 |
| 6. | 29.401 | 15.584 | Amtir-1 | 15.34 |
| 7. | 61.731 | 6.995 (back space) | | 17.68 |
| 8. | Plano | 0.635 (Window) | (n = 3.42) | |
| 9. | Plano | 1.040 | | |

\* all above parameters are in millimetres.

MTF at 10 lp/mm

| Axis | Vertical Edge | Horizontal Edge | Corner |
|---|---|---|---|
| 0.62 Distortion | 0.57/0.47 | 0.54/0.48 | 0.43/0.41' |
| 0.0 | −3.39% | −5.93% | −9.09% |

The following notes apply to FIG. 10
1. Material-Optical grade Amtir-1
2. R1=32.371±0.0066;R2=61.528±0.123.
3. Surface Accuracy- 4 fringes, ±1. fringe at 632.8 nm.
4. Surface Irregularity−1 fringe at 632.8 nm.
5. Surface Quality- 60-40.
6. Centering Error- 6 minutes of arc, maximum.
7. Diameter-TBD.
8. Surfaces marked P polish, all others ground 220 grit.
9. Break all edges 0.25 max by 45° typ.
10. Clear Aperture-Entrance 33.65 min. Exit 31.79 min.

The following notes apply to FIG. 11:
1. Material-Optical grade Zinc Selenide
2. R1=30.720±0.061;R2=−41.462±0.081.
3. Surface Accuracy- 3 fringes, ±1. fringe at 632.8 nm.
4. Surface Irregularity−1 fringe at 632.8 nm.
5. Surface Quality- 60-40.
6. Centering Error- 6 minutes of arc, maximum.
7. Diameter-TBD.
8. Surfaces marked P polish, all others ground 220 grit.
9. Break all edges 0.25 max by 45° typ.
10. Clear Aperture-Entrance 20.95 min. Exit 19.20 min.

The following notes apply to FIG. 12:
1. Material-Optical grade Amtir-1
2. R1=29.401±0.059; R2=61.731 ±0.125.
3. Surface Accuracy-3 fringes, ±1. fringe at 632.8 nm.
4. Surface Irregularity-1 fringe at 632.8 nm.
5. Surface Quality-60-40.
6. Centering Error-6 minutes of arc, maximum.
7. Diameter-TBD.
8. Surfaces marked P polish, all others ground 220 grit.
9. Break all edges 0.25 max by 45° typ.
10. Clear Aperture-Entrance 15.34 min. Exit 17.68 min.

2. Electronic Circuit

The block diagram of the BST electronic circuit is shown in FIG. 13. The IR radiation 110 from the target is collected by the Objective lens 120 and modulated by the Chopper 125 to become AC signal and goes to the UFPA 130. There are Array bias 132 and Array address generator 134 connecting with the UFPA. Immediately after the UFPA is the High-pass filter 136 to filter out low frequency noise and the Amplifier 138 to get certain gain because the signal from the UFPA is weak. Since the UFPA manufacturing technology is not as mature as the visible CCD, therefore Course pixel offset correction 140 is applied by comparing with the offset ROM 142 through an 8-bit Digital to Analog (D/A) converter 144. Then automatic contrast control 146 is performed. After the anolog signal processing is completed, a 12-bit Analog to Digital (A/D) converter 148 is used for further digital signal processing. In order to get better image representation, 12-bit Field Subtraction 150 and Alternate Field Inversion 152 are done through 12-bit Field RAM 154. By using the 12-bit Look-up table or Gain ROM 156 furnished by the UFPA manufacturing factory, the non-uniformity and dead pixel are corrected by the 12-bit Gain Correction Circuit 158 because the uniformity of UFPA is not even and some pixels are even dead. The dead pixels must be replaced by their surrounding live pixels. After the gain correction is done, automatic Brightness Control 160 and B$W to Color image Converter are used. Up to here the digital image processing is finished. Therefore, a 12-bit D/A converter 164 is adopted to let the digital signal return to the analog signal because most displays are analog. After Video Formatting 166, the standard analog image output RS-170 is sent to the Display 168 (such as the LCD on the helmet) for User observation 170 (such as the fire fighter). As shown in FIG. 2, the displayed image and Voice input go to the wireless transmitter on the fire fighter (user) side and are sent to the receiver on the commander side to display the image and voice on the commander's helmet or monitor. If the commander wants to communicate with the fire fighter, he can send the map, manual and instruction to the fire fighter and display on the helmet by using the transmitter on his side.

3. Liquid Crystal Display (LCD)

During fire fighting or war, it is very important that during the thermal image viewing the helmet display should not block fire fighter's or soldier's normal vision, thus they can have free walk and shooting. Otherwise they will be in a dangerous situation. Although the pilot's head up display has the see though ability, the thermal image is not clear and has low contrast. It is similar to look the image reflected by newspaper to the windshield during car driving.

In our design, we adopted the similar principle of bifocal farsighted eyeglass design. When the user's eye is straight forward he can see the target in far distance; when his eye is down, he is able to read the newspaper. Our LCD design is similar but in the reverse order.

The structure of the LCD is shown in FIG. 14. Behind the backlights 210 is the LCD driving board 220. In the front of the LCD 230 is the viewing optics 240. Our key design is that we put the LCD and viewing window at the bottom of the display, thus the LCD will not block fire fighter's normal vision when his eye is straight forward or down. He can walk freely. However, when he rotates up his eyeball a little bit, he is able to see the IR image on the LCD with high contrast.

In order to eliminate the parallax, the optical axis of one of the two viewing windows will align to the optical axis of the objective lens, and the another window has a plastic cover to be pulled down. If small parallax for another eye is allowed, the user can use his two eyes for more comfortable observation without pulling down the plastic cover.

4. Wireless Video and Audio Transmission

During fire fighting, the room and even the whole building is filled by heavy smoke. Only the fire fighter wearing the IR helmet is able to see the scene under the smoke cover. It is necessary to let his commander in fire truck or rear headquarters to see the scene and talk with him. Similarly, he also wishes that the commander could send the documents (such as instructions, building maps, manuals, etc.) to him and display on his helmet, thus he does not need to bring the heavy metal document case. Therefore, a wireless transmitter and receiver pair (transceiver) is equipped on the helmet. The transceiver has two frequencies (channels). One is for sending information and the another one is for receiving information. In order to send and receive audio and color video (such as the IR human image is in blue pseudocolor and the IR fire image is in red pseudocolor), the bandwidth is 6 MHz.

The schematic of the transmitter is shown in FIG. 14. Its size is as small as the smallest finger. It can penetrate the concrete wall even the metal cover, because the metal cover becomes a new antenna of the transmitter. This small transmitter is able to send the audio and color video to a remote location 500 meters away in any direction.

5. Voice Controller

In fire fighting, it is not convenient to operate switches on the helmet because fire fighter wears thick glove. Hands-free operation is preferred. Therefore, as shown in FIG. 16, a voice activated switch or command board (voice controller) is designed. After training, the voice chip will recognise the user's voice and activate the switch. If the user says: "power on", the power will be on; if he says: "power of", the power will be off. If the user says: "cali. On", the calibration will be started; if he says: "cali. Off", the calibration will be stopped. Similarly, the user can give command to send or receive audio and video, and so on.

6. Pattern Recognition

In fire fighting, the fire fighter is mainly interested in to find two targets: human victim and fire. His duty is to rescue human being and kill the fire. Therefore, after training, to use fuzzy logic or neural network chip automatically find and recognise human being or fire becomes possible because these two targets are simple targets and have very different temperatures. Therefore, the fire fighter does not need to always look the LCD, the IR camera will automatically search the targets. When the camera finds a human victim, it will give a long beep; if the camera finds a fire, it will give two short beeps. Only at that time, the fire fighter needs to look the LCD.

If the scene is complicated, the fire fighter can send the images to the rear host computer through antenna. After the computer recognises the target, the image can be sent back to the fire fighter and displayed on his helmet.

PREFERRED EMBODIMENT OF ACTIVE IR IMAGING SYSTEM

The diagram of the preferred embodiment of the active IR imaging system is shown in FIG. 17. The Near Infrared Eye-safe Laser Diode (LD) 310 is powered by the Power Supply 320 and goes to the Beam Splitter 330. 50% of the LD light is reflected by the beam splitter and projected by the Objective Lens 340 to illuminate the target 350. The beam returned from the target goes to the UFPA of BST 360 through the beam splitter 330. The BST is sensitive for both active NIR and passive LIR, thus they can share the same UFPA to reduce the volume, weight and cost. The beam splitter made by ZnSe is almost 100% transparent for LIR of 8–12μ. If the LD is mounted beside the objective lens to independently illuminate the target, the beam splitter is not necessary to use.

There is a Photo Detector 370 on the edge of the objective lens to check if the LD is expanded by the lens in the front of the LD. If the photo detector can not receive the LD light, the related Control Circuit 372 will shut down the power supply to prevent of high energy thin laser beam going to the target (such as the fire fighter) although the LD is eye-safe.

Because the laser beam is in a very narrow waveband of a few nanometers, as shown in FIG. 18, in this waveband its intensity can be much higher than the flame radiation of 1,000° C. It can penetrate the firewall to illuminate a person behind the fire. Therefore, if a very narrow band filter of a few nanometers 380 is placed in the front of the objective lens to only allow the laser beam to pass, a clear human image can be obtained. In this situation the active system is much better than the passive system because the passive IR imager can not see through the firewall.

SPECIFICATION OF THE INVENTED SYSTEM

The specification of the invented system is listed on Table 3.

Table 3, Specification of the Head/Helmet Mounted Passive & Active IR Imaging System Basic Features LWIR passive imaging and NIR eye-safe active imaging combination; see through smoke, dust, haze, and darkness; detect a person behind firewall; hand-free operation; fit any mask; talk under the mask without using mouth; not block normal vision; wireless video and audio transmission; clip-on/release type mounting; fire proof and water proof; light weight and compact; no attachment on the belt; pseudocolor image; no parallax between camera and viewer (new model); monocular/binocular (new model); voice activated command (new model); pattern recognition (new model); multi-spectral color imaging (new model); $I^2$/LWIR combination (new model). The total weight of 160×120 version is only 0.5 Lb. The following specification is for the large format of 320×240 pixels.

1. PHYSICAL

| | |
|---|---|
| Height and volume (NIR/LIR camera with 18 mm lens + display): | Height: 4.0" total<br>Volume: 35.56 inch³ for BST and 34.93 inch³ for MBT |
| Weight (NIR/LIR camera with 18 mm lens + display): | 1.55 Lb. For BST and 1.53 Lb. For MBT |
| Parallax (or dead angle) between camera (eye) and display: | 1° (for old version)<br>0° (for new version) |
| Normal vision: | Not blocked |
| Display adjustment: | Up/down, forward/back, and title; It fits any mask. |
| Helmet mount: | Clip-on type for any helmet; Military AN/AVS-6 and AN/PVS-15 (optional) |
| Gravity center | On the center of helmet |

2. DETECTOR

| | |
|---|---|
| Sensor materials: | Uncooled Barium Strontium Titanate (BST) or Microbolometer (MBT) |
| Spectral range: | MBT: 8–12μ: BST: 1–5μ |
| Resolution: | 320 × 240 pixels (or 160 × 120 pixels) |
| Pitch: | 50μ (optional: 25μ for new model) |
| MRT: | 0.07° C. at 0.05 cy/mr, measured with F/1.0 objective lens at 25° C. |
| Sensitivity: | 50 mv/° C. |
| Absorption efficiency: | 80% |
| Pixel clock speed: | ~6 MHz |
| Package | Vacuum 40 pin ceramic |
| Temperature stabilisation | TE cooler |

3. OPTICAL

| | |
|---|---|
| Optical Lens (non-Ge): | f = 18 mm, F = 1.0, 1–12μ |
| Depth of Field: | 1M to infinity (3 ft to infinity) |
| Focus Range: | 0.3M to infinity (1 ft to infinity) |
| Field of View: | 48° H × 37° V |
| Instantaneous FOV: | 2.60 mrad (1.30 mrad for 25μ FPA) |
| Eye-safe Laser Diode | GaAsInP, 1.55μ, CW |
| Beam Splitter Transmission | 50% before 8μ, 100% at 8–12μ |

4. ELECTRICAL

| | |
|---|---|
| Power consumption: | 4.0 W |
| Operating voltage: | 9 to 14 VDC |
| Battery: | One 9.6 V or Two 6 V NiCd batteries |
| Battery lasting time: | 3.5 hrs |
| Over voltage protection: | −12 to 40 VDC |

5. ENVIRONMENTAL

| | |
|---|---|
| Operating temperature: | −40° C. to 70° C. |
| Storage temperature: | −40° C. to 90° C. |
| Magnetic electric field: | Immune (optional case) |
| Environmental resistances: | Water, fire, salt fog, vibration, shock |

6. PERFORMANCE

| | |
|---|---|
| Video output: | RS-170 or CCIR |
| Range to detect a person (with 18 mm lens): | 300 m; the bigger the lens, the longer the distance. |
| Startup time: | <20 sec. (see a stable image) |
| Recovery time from hot source: | <66 ms |
| Time of offset normalization: | <1 sec. |
| Frame rate: | 30 Hz or 60 Hz non-interlaced |
| Shades of gray: | 256 discrete levels |
| Contrast/Brightness/Gain/Level controls: | Automatic |
| Polarity control: | Black-hot/White-hot, selectable |
| Interpupillary distance adjustment range: | 50–74 mm |
| Microphone | Piezoelectric film on forehead or neck |
| Wireless video & audio link: | 1,500 ft, using a 0.25 W transmitter with size of 0.1" × 0.4" × 1.5"; optional: 3,000 ft using larger transmitter. |
| Pseudocolor Image | Yes |
| The IFF ability: | Yes, by using active infrared |
| Optional: | Voice-activated switch/command, Multi-spectrum, $I^2$/IR combination. |

After the passive and active IR imaging systems are built, they are mounted on the head mount or helmet. The old version has a parallax of 1°. The new version does not have parallax.

By using the old version system, we had 6 successfully demonstrations in Dayton, Ohio; Pittsburgh, Pa.; Miami Fla.; Shanghai China; Singapore; and Taiwan. Air Force had released special news to nation wide media, many TV stations had shown the demonstrations at their prime time, and many newspapers had issued reports at their main sections.

What is claimed is:

1. A passive/active infrared imaging system including apparatus for mounting on a head/helmet comprising:

a passive infrared camera Head Pack having a removable narrow band filter cover, an objective lens, a beam splitter, an uncooled focal plane array (UFPA package, an interface board, and a display unit, with forward/back, up/down, and tilt adjustment functions fitting any mask, mounted in the front of said head/helmet for converting infrared light images into from different types of object in an external scene electronic signals;

electronic means coupled between the UFPA of the infrared camera and the display unit, including controller means, for processing video signals from the infrared camera and supplying them to the display unit; wherein the electronic means includes a wireless video & audio transceiver, a piezoelectric microphone, a voice controller, and a neural network pattern recognition chip;

said display unit being inside the head pack and mounted on said head/helmet for converting electronic signals into visible light images; so that it is in front of eyes of a user, so that the user can directly view the external scene without blocking his normal vision, if the optical axis of the display unit is aligned with the optical axis of the objective lens, the system parallax is eliminated; the arrangement of the display unit being such the user can view the same external scene either directly or on the display unit by a simple eye movement;

a Battery Pack having video controller board and battery mounted on the rear of said head/helmet so that it fives the video output and power to the infrared system;

an eye-safe near infrared laser diode with corresponding optical and electronic attachments mounted on said head/helmet to illuminated targets to get images through same passive infrared system, the narrow band filter being used to pass infrared radiation in a band corresponding to that of the laser diode.

2. An infrared imaging system according to claim 1, wherein said different types of objects include flames and human beings, and the means for causing the objects to be displayed in a distinctive manner include means for coloring the different types of objects.

3. An infrared system according to claim 2, for use at a fire fighting scene to detect and recognize flames and human beings in the presence of heavy smoke, dust and darkness, wherein said infrared camera comprises, an objective lens, with/without a chopper, the uncooled focal plane array (UFPA), several electronic boards, the display unit which is a Liquid Crystal Display (LCD), a wireless transceiver pair, a piezoelectric or normal microphone, a voice controller, the neural network pattern recognition chip, the eye-safe laser diode (LD), a beam splitter, the removable narrow band filter, and a clip-on 3-D adjustment mount;

the transceiver pair being adapted for sending signals representing the external scene to another location, and for receiving signals representing information for display on the on the display unit.

4. An infrared imaging system according to claim 3, wherein said objective lens made by non-Ge materials of ZnSe, or $(ZnS)_x(ZnSe)_{1-x}$, and AMTIR-1 comprises three pieces; the first piece and the third piece are AMTIR-1 and the second piece is ZnSe or $(ZnS)_x (ZnSe)_{1-x}$, the material of $(ZnS))_x$ or $(ZnSe)_{1-x}$ being produced by chemical vapor deposition (CVD), or Hot-pressed method, the waveband of the objective lens being from near infrared to long infrared to cover both active infrared and passive infrared.

5. An objective lens according to claim 4, wherein said structures of the objective lens and its 3 elements are shown in FIGS. 8–12, and their data is listed on Table 1.

6. An infrared imaging system according to claim 3, wherein said chopper for Barium Strontium Titanate (BST) (there is no chopper for uncooled silicon microbolometer (MBT)) is made by plastic with Archimedes curve shape.

7. An infrared imaging system according to claim 3, wherein said focal plane array is an uncooled focal plane array of uncooled silicon microbolometer (MBT) or Barium Strontium Titanate (BST).

8. An infrared imaging system according to claim 3, wherein said electronic boards for Barium Strontium Titanate (BST) having basic block diagrams is shown in FIG. 13, (the electronic boards for uncooled silicon microbolometer (MBT) are similar but the MBT is direct current (DC) coupling because there is no chopper thus no frame subtraction).

9. An infrared imaging system according to claim 3, wherein said Liquid Crystal Display (LCD) has a basic structure shown in FIG. 14, the LCD can be passive or active matrix, and a window (viewer) of the LCD is at the bottom of the LCD device, thus the normal vision of the user will not be blocked.

10. An infrared imaging system according to claim 3, wherein the optical axis of said LCD is a aligned with the optical axis of said objective lens, thus the parallax is eliminated, wherein the LCD can be monocular or binocular, wherein in the binocular version, its one viewer must be aligned with the objective lens to remove the parallax, but another viewer will have small parallax if its plastic cover is not pulled down to cover this viewer, and if the parallax is allowed, it is not necessary to align the LCD with the objective lens.

11. An infrared imaging system according to claim 3, wherein said wireless video & audio transmitter and receiver (transceiver) shown in FIG. 15 have at least two frequencies of $f_1$ and $f_2$ wherein the frequency of transmitter on user side is $f_1$ and the frequency of receiver is $f_2$, and the frequency of transmitter on commander side is $f_2$ and the frequency of receiver is $f_1$.

12. An infrared imaging system according to claim 3, wherein said microphone is a piezoelectric film contacting with user's forehead or neck, or is manufactured with the earphone together as a ear plug and inserted into ear to speak under the mask without using mouth and receive the voice from receiver, in which case any large sound or noise from outside will affect user's voice, or the microphone also can be a normal one molded on the inner layer of the mask.

13. An infrared imaging system according to claim 3, wherein said voice controller shown in FIG. 16 is used to control switches or give commands without using hands.

14. An infrared imaging system according to claim 3, wherein said pattern recognition uses fuzy logic or neural network chip to distinguish the human being and flame from background.

15. An infrared imaging system according to claim 3, wherein said active IR imaging system comprises a narrow band filter, an eye-safe laser diode, a beam splitter and other attachments is shown in FIG. 17, wherein the active system shares other parts including an objective lens, UFPA, electronic boards, LCD, mount, with the passive IR imaging system, and is able to clearly see a person behind the firewall and identify the friend or foe.

16. An infrared imaging system according to claim 3, wherein said eye-safe laser diode (LD) is made by GaAsInP or other semiconductor materials with wavelength greater than 1.5 µm, thus the laser beam can not reach the retina of the eye.

17. An infrared imaging system according to claim 3, wherein said beam splitter has 50% transmittance and 50% reflectance before 8 µm for LD use, and almost 100% transmittance from 8 µm to 12 µm, wherein if the LD is independently illuminating the target, the beam splitter is not necessary to use.

18. An infrared imaging system according to claim 3, wherein said narrow band filter with bandwidth of a few nanometers at LD wavelength is put in the front of the objective lens and is removable if the user does not like to see through the firewall.

19. An infrared imaging system according to claim 3, wherein said head/helmet mount is spring-loaded or dovetail type shown in FIGS. 6 and 7, or other types, with forward/back, Up/down, and tilt adjustment functions to fit any mask without block user's vision.

* * * * *